Dec. 15, 1964   J. K. BATES, JR   3,161,766

VOLTAGE RATIO TO TIME DIFFERENCE TRANSLATOR

Filed May 3, 1963

INVENTOR.
JOHN K. BATES, JR.
BY Hapgood + Calimafde
ATTORNEY

United States Patent Office 3,161,766
Patented Dec. 15, 1964

3,161,766
VOLTAGE RATIO TO TIME DIFFERENCE TRANSLATOR
John Kenneth Bates, Jr., State College, Pa., assignor to HRB-Singer, Inc., State College, Pa., a corporation of Pennsylvania
Filed May 3, 1963, Ser. No. 277,766
3 Claims. (Cl. 235—195)

This invention relates generally to electrical circuits for measuring voltage ratios and more particularly to electrical circuits for translating voltage ratios into time differences. The invention is useful in analog computers, automatic control systems, radio direction finders, and in many other applications which involve the measurement of voltage ratios or the translation of voltage ratios into time differences.

In the past, measurement of voltage ratios over a wide dynamic range has been accomplished by two methods: (1) the logarithmic difference method, and (2) the trignometric solution method. In the logarithmic difference method, each voltage of the voltage ratio was applied to a separate amplifier having a logarithmic amplification function, and the output of the two logarithmic amplifiers were subtracted to produce an output voltage proportional to the logarithmic of the input ratio in accordance with the well known formula $\log (E_1/E_2) = \log E_1 - \log E_2$. The logarithmic method is simple, but it is subject to large errors and can be used only for crude interpolations. The trignometric method is more accurate. It employs the trace on a cathode ray tube where the angle of the trace is $\theta = \tan^{-1} E_1/E_2$. This is accomplished by applying the voltage $E_1$ to the vertical deflection plates of the cathode ray tube and applying the voltage $E_2$ to the horizontal deflection plates. The trignometric method, however, has the disadvantage of requiring a cathode ray tube and also requiring complex circuitry for trasnlating the angle $\theta$ into a form which can be used electrically.

Accordingly, one object of this invention is to provide a simple and accurate means of translating a voltage ratio into a time difference.

Figure 1:
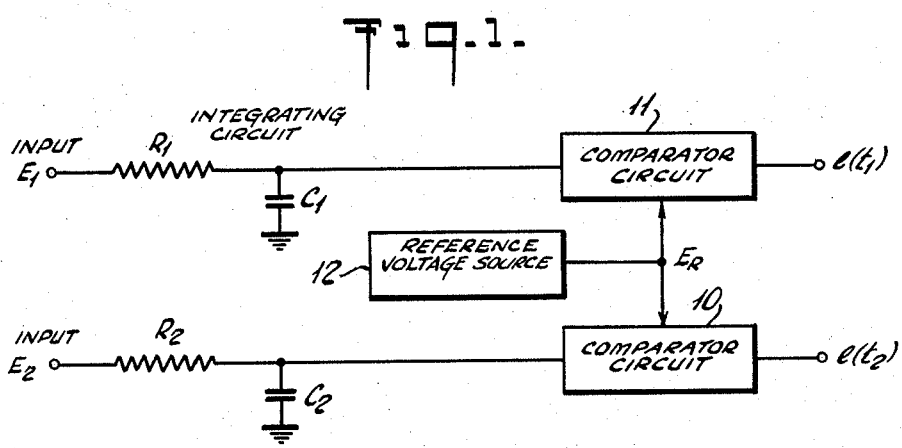
Figure 2:
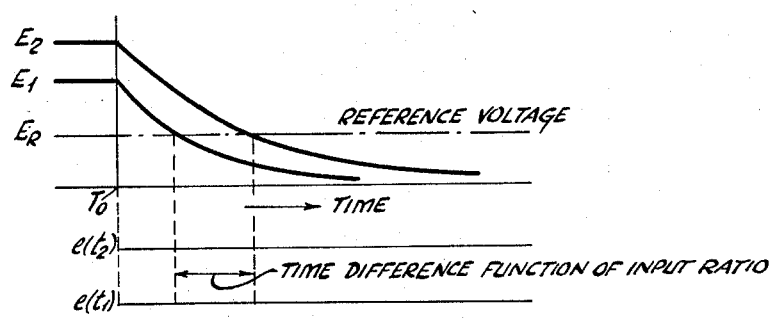

Other objects and advantages of the invention will be apparent to those skilled in the art from the following description of one illustrative embodiment thereof, as illustrated in the accompanying drawings, in which:

FIG. 1 is a partial schematic circuit diagram of a first illustrative embodiment of the invention; and FIG. 2 is a set of waveforms illustrating the operation of the embodiment shown in FIG. 1.

FIG. 1 shows an embodiment of the invention which is adapted to measure the ratio of two time-coincident input pulses having different amplitudes $E_1$ and $E_2$ which may vary over a wide range of values. In this embodiment, the input pulses are applied to corresponding integrating circuits comprising resistor R1 and capacitor C1 and resistor R2 and capacitor C2. The time constant of the integrating circuits are chosen so as to allow capacitors C1 and C2 to charge up to $E_1$ and $E_2$, respectively, before the input pulses terminate at time $T_0$. When the input pulses terminate, the integrating circuits apply a logarithmic decay function to the charge on the two capacitors, which discharge according to the function $Ee^{-t/RC}$. It should be noted that this logarithmic function can be made very precise and that it holds its characteristics over an infinite dynamic range. Furthermore, this logarithmic function is much less sensitive to temperature and humidity variations than the functions produced by logarithmic amplifiers, and it is extremely simple and inexpensive to produce.

The logarithmic function output of the two integrating circuits are applied to comparator circuits 10 and 11, which each receive a reference voltage level $E_R$ from a reference voltage source 12. Comparator circuits 10 and 11 are each adapted to produce an output signal when the two inputs thereto are equal. Accordingly, the comparator circuits produce output pulses $e(t_1)$ and $e(t_2)$ at times proportional to the logarithm of their respective input signal, and the time difference $t_1 - t_2$ between the two output pulses is proportional to the ratio $E_1/E_2$, as shown by the following mathematical analysis:

(1) $\quad E_R = E_1 e^{-t_1/RC} = E_2 e^{-t_2/RC}$ (2) $\quad E_1/E_2 = \dfrac{e^{-t_1/RC}}{e^{-t_2/RC}}$ (3) $\quad (E_1/E_2) e^{-t_2/RC} = e^{-t_1/RC}$ (4) $\quad \log (E_1/E_2) + \dfrac{t_2}{RC} = \dfrac{t_1}{RC}$ (5) $\quad t_1 - t_2 = RC \log \dfrac{E_1}{E_2}$ From the foregoing equations it will be apparent that the time difference $t_1 - t_2$ is independent of the absolute magnitude of the voltages $E_1$ and $E_2$ and only dependent on the ratio of $E_1$ and $E_2$.

The above described embodiment can be easily adapted to measure static voltage ratios by incorporating a switch in the input circuit to artificially generate the trailing edge of an input pulse, as will be readily apparent to those skilled in the art. In addition, the above described embodiment can be adapted to measure voltage pulses that occur at different times by incorporating a storage circuit into the input, as will also be readily apparent to those skilled in the art.

From the foregoing description it will be apparent that this invention provides a simple and accurate means of translating a voltage ratio into a time difference. And it should be understood that this invention is by no means limited to the particular embodiment disclosed in this patent application. Many modifications can be made in the disclosed circuit without departing from the basic teaching of this circuit. For example, an exponential ringing circuit or its mechanical equivalent might be used in place of the RC integrator circuits disclosed herein. These and many other modifications will be apparent to those skilled in the art, and this invention includes all modifications falling within the scope of the following claims.

What is claimed is:

1. A voltage ratio time difference translator circuit comprising: a pair of inputs for receiving two signals to be compared; a pair of logarithmic decay function generators, each connected respectively to said pair of inputs for similarly decaying the input signals received thereon; and means coupled to said function generators for producing an output signal when each of the generated functions reaches a predetermined level, whereby the time difference between the occurrence of the thus produced output signals is a function of the voltage ratio of the input signals.

2. The combination defined in claim 1 wherein each said logarithmic function generators comprises an integrator circuit.

3. The combination defined in claim 2 wherein said output means comprises a common reference source and a pair of comparator circuits each coupled between a corresponding one of said integrator circuits and said common reference source.

References Cited in the file of this patent
UNITED STATES PATENTS
2,888,647   Beter _____ May 26, 1959
3,043,516   Abbott _____ July 10, 1962